(No Model.)
E. B. SHEPARDSON.
COMBINED SQUARE, CENTER SQUARE, AND BEVEL.
No. 404,312. Patented May 28, 1889.
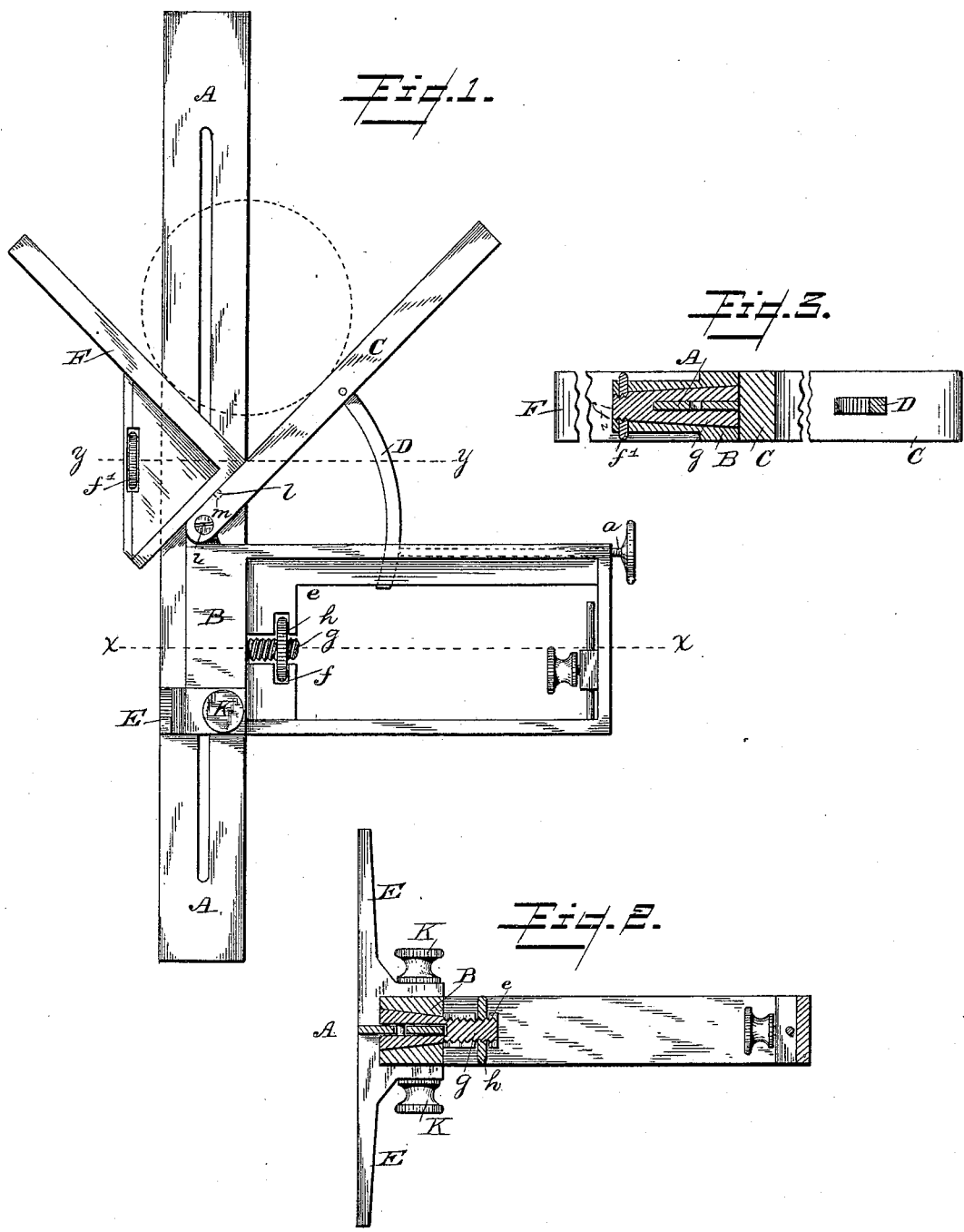
WITNESSES.
Jos. H. Blackwood
F. A. Marsh
INVENTOR.
E. B. Shepardson
per Edw. W. Down
Attorney.

UNITED STATES PATENT OFFICE.

EDWARD B. SHEPARDSON, OF GREENFIELD, MASSACHUSETTS.

COMBINED SQUARE, CENTER-SQUARE, AND BEVEL.

SPECIFICATION forming part of Letters Patent No. 404,312, dated May 28, 1889.

Application filed December 11, 1888. Serial No. 293,290. (No model.)

*To all whom it may concern:*

Be it known that I, EDWARD B. SHEPARDSON, a citizen of the United States, residing at Greenfield, in the county of Franklin and State of Massachusetts, have invented certain new and useful Improvements in Implements for Carpenters' and Joiners' Use; and I do hereby declare the following to be a full, clear, and exact description of the invention, such as will enable others skilled in the art to which it appertains to make and use the same.

My invention is an improvement in implements for carpenters' and joiners' use; and it embraces a combination of devices by which, when properly manipulated, a try-square, a bevel, a T-square, and a centering-instrument may be formed, and, in fact, a complete tool of this class which will enable a master workman to obtain any lines or angles required in trying or making his work.

In the drawings illustrating the invention, Figure 1 is a side elevation of the implement complete, with the parts adjusted so as to illustrate the principal uses to which it may be put. Fig. 2 is a transverse section on line $x$ $x$ of Fig. 1. Fig. 3 is a section through line $y$ $y$ of Fig. 1.

Similar reference-letters indicate like parts in all of the figures.

Referring to the drawings, B is the head of the implement, rectangular and oblong in shape, and preferably of metal. C is a hinged arm which closes against one of the edges of the said head, and when closed forms, in fact, a part of the same. To the hinged portion C is pivoted an arc or quadrant, D, the free end of which enters a slot in an adjacent portion of the head B. A long set-screw, $a$, is adapted to run longitudinally into the head B, to the slot for the arc or quadrant D, to clamp the hinged arm C to any desired angle with reference to the edge of the head against which it closes.

One of the ends of the head B is provided with a slot, through which slides a slotted blade, A, which forms, together with the said head, a right angle. The blade A slides also through a slot in the hinged arm C. Consequently there is provided, also, a slot therein next the hinge-joint.

The base of the head B has a flange, $e$, in which is cut a cross-shaped slot, $f$, and in the larger portion of the base of said head is a conical opening—a continuation of the said slot $f$. A screw, $g$, has a conical slotted head, which is normally spread open to form jaws, and a thumb-nut, $h$. The screw $g$ fits in the conical and cross-shaped openings of the head, the said slotted screw forming, when the nut is driven upon said screw, a clamp for the blade A.

The attached arm C of the head B is hinged to the main portion of the same by pins $i$, which, however, do not pass across the slot to be occupied by the blade A.

By means of the slot of the blade and a pin which passes through the jaws of the screw $g$ and the said slot the head and the blade are held together. By turning the nut $h$ to the right the blade is firmly clamped to the head B, and by reversing the said nut the blade A is loosened, so that it may be shifted to the right or left.

Auxiliary to the head B are arms E in the form of angle-plates, which are attached to the said head by means of thumb-screws K. These arms, when in position, are at right angles to the broad surfaces of the blade A, and are used with the latter when it is desirable to try the broad surface and edge of a piece of material simultaneously.

In connection with the implement as thus described I employ a rectangular piece, F, provided with a conical-headed screw and nut, $f'$ $f'$, similar to those of $g$ and $h$, suitably housed, the end of said screw-head being rectangular to conform to the two faces of the said piece F. The piece F is provided with a slot through its angle, adapted to fit over the blade A, and on either side of this slot are short lines $l$, adapted to fit in corresponding openings, $m$ $m$, in the hinged arm C.

The piece F may be slid on the blade A and clamped to the same in the same manner as described for the clamping device for the head B.

When the centering device is required, (see Fig. 1,) the hinged piece C is adjusted so as to form with the blade A an angle of forty-five degrees, and the piece F is fitted to the face of the said piece C and clamped to the said blade A, so that between the long face of the piece F and the face of the arm C there will be an angle of ninety degrees exactly divided by one edge of the said blade A.

When a disk or cylinder or anything representing a circle is to be centered, the faces of the two parts C and F will form tangents to the outline of the circle inclosed and the edge of the blade will exactly divide the same. After drawing a line by the edge of the blade, by shifting the circle about its axis another line drawn at the edge of the blade will intersect the first line exactly in the center of the circle.

A T-square may be formed with the implement by shifting the head B centrally on the blade A and clamping the two together. It is to be understood, as a matter of course, that the head B and the piece F always form shoulders with reference to the blade A, so that the said shoulders always rest against one edge or face of the material to be tried, while the blade bears on one of the other edges or faces.

When it is desirable to mark a miter, the hinged piece C is suitably adjusted and fixed with reference to the head B and the blade A, and the blade is to be laid on the face of the "stuff" to be mitered, with its edge in the miter line, while the said piece bears on another face of the said stuff.

It is unnecessary to mention other uses to which the implement may be applied, as any expert will readily understand its full use.

Having thus described my invention, what I claim as new, and desire to secure by Letters Patent, is—

1. The combination, with the head B, provided with a slot at its base edgewise to fit over the blade of a square, and having a conical opening, and a T-opening to receive a conical-headed screw and the nut of the same, of the slotted conical clamping screw and head and the blade A, as and for the purpose set forth.

2. The combination, with the rectangular head B, the clamping screw and nut $g$ $h$, fitted therein, as described, the screw $a$, and the slotted blade A, of the arm C, pivoted to an exterior angle of the said head, and the arc D, pinned to said arm and arranged to enter a slot in the edge of said head, as specified.

3. The combination, with the head B, hinged arm C, provided with an arc, D, substantially as described, of the blade A and auxiliary piece F, provided with a conical opening, and a slot to receive, respectively, the conical slotted screw and the head of the same, and the conical slotted screw-bolt, as and for the purpose set forth.

In testimony whereof I affix my signature in presence of two witnesses.

EDWARD B. SHEPARDSON.

Witnesses:
JAMES S. GRINNELL,
CHAS. ALLEN.